(12) United States Patent
Aguilera et al.

(10) Patent No.: US 9,626,404 B2
(45) Date of Patent: *Apr. 18, 2017

(54) DISTRIBUTED SQL QUERY PROCESSING USING KEY-VALUE STORAGE SYSTEM

(71) Applicant: Microsoft Technology Licensing, LLC, Redmond, WA (US)

(72) Inventors: Marcos K. Aguilera, Mountain View, CA (US); Joshua Leners, Austin, TX (US); Michael Walfish, Austin, TX (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/989,027

(22) Filed: Jan. 6, 2016

(65) Prior Publication Data
US 2016/0117363 A1    Apr. 28, 2016

Related U.S. Application Data

(63) Continuation of application No. 13/712,993, filed on Dec. 13, 2012, now Pat. No. 9,268,834.

(51) Int. Cl.
*G06F 17/30* (2006.01)

(52) U.S. Cl.
CPC .. *G06F 17/30418* (2013.01); *G06F 17/30427* (2013.01); *G06F 17/30463* (2013.01); *G06F 17/30575* (2013.01); *G06F 17/30356* (2013.01); *G06F 17/30864* (2013.01)

(58) Field of Classification Search
CPC ......... G06F 17/30575; G06F 17/30864; G06F 17/30356; G06F 17/30463; G06F 17/30418; G06F 17/30398; G06F 17/308641

USPC ......................................... 707/759, 760, 831
See application file for complete search history.

(56) References Cited

U.S. PATENT DOCUMENTS

| | | | |
|---|---|---|---|
| 6,446,062 B1 | 9/2002 | Levine et al. | |
| 6,877,000 B2 | 4/2005 | Gajda et al. | |
| 7,024,431 B1 | 4/2006 | Kornelson et al. | |
| 8,499,121 B2 | 7/2013 | Tolia et al. | |
| 2003/0041097 A1 | 2/2003 | Tormasov | |
| 2005/0027725 A1* | 2/2005 | Kagalwala et al. | 707/100 |

(Continued)

OTHER PUBLICATIONS

Rodney Limpret, Microsoft Transaction Server, 1997, IEEE, 14-18.*

(Continued)

*Primary Examiner* — Jean B Fleurantin
(74) *Attorney, Agent, or Firm* — Jonathan M. Waldman

(57) ABSTRACT

Distributed storage systems support SQL while also providing scalability and fault tolerance by utilizing an SQL library (the SQL execution component) layered on top of a transactional key-value system (the storage component). The SQL library comprises a parser and an execution engine running at the client, while the storage component comprises a key-value system for storing the data. The SQL library parses SQL queries received from client applications and maps them to transactions on the key-value system. The key-value system stores data items identified by key and provides concurrency control mechanisms to handle concurrent transactions. The key-value system may be a distributed system with several storage servers, each attached to one or more storage devices.

19 Claims, 4 Drawing Sheets

(56) References Cited

U.S. PATENT DOCUMENTS

| | | |
|---|---|---|
| 2006/0173926 A1 | 8/2006 | Kornelson et al. |
| 2010/0211554 A1 | 8/2010 | Reid et al. |
| 2010/0241629 A1 | 9/2010 | Tatemura et al. |
| 2011/0246448 A1 | 10/2011 | Tatemura et al. |
| 2012/0016901 A1 | 1/2012 | Agarwal et al. |
| 2012/0310916 A1 | 12/2012 | Abadi et al. |
| 2013/0054869 A1 | 2/2013 | Tolia et al. |
| 2013/0103729 A1 | 4/2013 | Cooney et al. |

OTHER PUBLICATIONS

""NO" SQL and Cloud Computing", Retrieved from <<http://clean-clouds.com/2011/10/14/nosql-cloud-computing/>>, Oct. 14, 2011, 8 Pages.

"Amazon Simple Storage Service (Amazon S3)", Retrieved from <<http://web.archive.org/web/20120917010943/http://aws.amazon.com/s3/>>, Retrieved Date: Sep. 17, 2012, 6 Pages.

"Apache CouchDB", Retrieved from <<http://web.archive.org/web/20120919035910/http://couchdb.apache.org/>>, Retrieved Date: Sep. 17, 2012, 9 Pages.

"Clustrix", Retrieved from <<http://web.archive.org/web/20121003153848/http://www.clustrix.com/>>, Retrieved Date: Sep. 17, 2012, 6 Pages.

"GenieDB", Retrieved from <<http://web.archive.org/web/20120922092337/http://www.geniedb.com/>>, Retrieved Date: Sep. 17, 2012, 2 Pages.

"MongoDB", Retrieved from <<http://web.archive.org/web/20120918010809/http://www.mongodb.org/>>, Retrieved Date: Sep. 17, 2012, 1 Page.

"MySQL Cluster CGE", Retrieved from <<http://web.archive.org/web/20120917115301/http://www.mysql.com/products/cluster>>, Retrieved Date: Sep. 17, 2012, 2 Pages.

"Scalaris, Distributed Transactional Key-Value Store", Retrieved from <<http://web.archive.org/web/20120924201511/http://code.google.com/p/scalaris/>>, Retrieved Date: Sep. 17, 2012, 2 Pages.

"Scale Arc", Retrieved from <<http://web.archive.org/web/20120919060734/http://scalearc.com/>>, Retrieved Date: Sep. 17, 2012, 3 Pages.

"ScaleDB: NewSQL Database for Public Cloud and Private Cloud", Retrieved from <<http://web.archive.org/web/20120914032824/http://www.scaledb.com/?>>, Retrieved Date: Sep. 17, 2012, 2 Pages.

"Snapshot Isolation", Retrieved from <<http://wayback.archive.org/web/20120917123023/https://en.wikipedia.org/wiki/Snapshot_isolation>>, Retrieved Date: Sep. 17, 2012, 4 Pages.

"SQL Features That SQLite Does Not Implement", Retrieved from <<http://web.archive.org/web/20120920035626/http://sqlite.org/omitted.html>>, Retrieved Date: Sep. 17, 2012, 2 Pages.

"Welcome to Apache HBase!", Retrieved from <<http://web.archive.org/web/20120915004900/http://hbase.apache.org/>>, Retrieved Date: Sep. 17, 2012, 1 Page.

"Final Office Action Issued in U.S. Appl. No. 13/712,993", Mailed Date: Dec. 3, 2014, 10 Pages.

"Non-Final Office Action Issued in U.S. Appl. No. 13/712,993", Mailed Date: Jun. 12, 2014, 12 Pages.

"Non-Final Office Action Issued in U.S. Appl. No. 13/712,993", Mailed Date: Mar. 25, 2015, 8 Pages.

"Notice of Allowance Issued in U.S. Appl. No. 13/712,993", Mailed Date: Oct. 7, 2015, 13 Pages.

Aguilera, et al., "A Practical Scalable Distributed B-Tree", In Proceedings of the VLDB Endowment, vol. 1, Issue 1, Aug. 24, 2008, 12 Pages.

Aguilera, et al., "Sinfonia: A New Paradigm for Building Scalable Distributed Systems", In Proceedings of the ACM Transactions on Computer Systems, vol. 27, Issue 3, Article 5, Nov. 2009, 48 Pages.

Alon, Mickey, "From Only-SQL to NoSQL to YeSQL", Retrieved from <<http://2011.secr.ru/lang/en-en/talks/from-only-sql-to-nosql-to-yesql>>, Retrieved Date: Sep. 17, 2012, 2 Pages.

Aspnes, et al., "Skip Graphs", In Proceedings of the ACM Transactions on Algorithms, vol. 3, Issue 4, Nov. 2007, 20 Pages.

Baker, et al., "Megastore: Providing Scalable, Highly Available Storage for Interactive Services", In proceedings of the Fifth Biennial Conference on Innovative Data Systems Research, Jan. 9, 2011, pp. 223-229.

Balakrishnan, et al., "CORFU: A Shared Log Design for Flash Clusters", In proceedings of the 9th USENIX Symposium on Networked Systems Design and Implementation, Apr. 25, 2012, 14 Pages.

Bernstein, et al., "Adapting Microsoft SQL Server for Cloud Computing", In Proceedings of the 27th International Conference on Data Engineering, Apr. 11, 2011, pp. 1255-1263.

Bernstein, et al., "Hyder-A Transactional Record Manager for Shared Flash", In Proceedings of the 5th Biennial Conference on Innovative Data Systems Research, Jan. 9, 2011, 12 Pages.

Calder, et al., "Windows Azure Storage: A Highly Available Cloud Storage Service with Strong Consistency", In Proceedings of the Twenty-Third ACM Symposium on Operating Systems Principles, Oct. 23, 2011, pp. 143-157.

Callaghan, Mark, "MySQL Versus MongoDB—Yet Another Silly Benchmark", Retrieved from <<http://mysqlha.blogspot.in/2010/09/mysql-versus-mongodb-yet-another-silly.html>>, Sep. 11, 2010, 14 Pages.

Cattell, Rick, "Scalable SQL and NoSQL Data Stores", In the Newsletter of ACM Special Interest Group on Management of Data Record, vol. 39, Issue 4, Dec. 2010, pp. 12-27.

Chang, et al., "Bigtable: A Distributed Storage System for Structured Data", In Proceedings of the 7th Conference on Usenix Symposium on Operating Systems Design and Implementation, vol. 7, Nov. 6, 2006, pp. 205-218.

Cipar, et al., "LazyBase: Trading Freshness for Performance in a Scalable Database", In Proceedings of the 7th ACM European Conference on Computer Systems, Apr. 10, 2012, 14 Pages.

Cooper, et al., "PNUTS: Yahoo!'s Hosted Data Serving Platform", In Proceedings of the VLDB Endowment, vol. 1, Issue 2, Aug. 24, 2008, 12 Pages.

Das, et al., "ElasTraS: An Elastic Transactional Data Store in the Cloud", In Proceedings of the Conference on Hot Topics in Cloud Computing, Jun. 15, 2009, 5 Pages.

Das, et al., "G-Store: A Scalable Data Store for Transactional Multi key Access in the Cloud", In Proceedings of the 1st ACM Symposium on Cloud Computing, Jun. 10, 2010, pp. 163-174.

Decandia, et al., "Dynamo: Amazon's Highly Available Key-Value Store", In Proceedings of the Twenty-First ACM Symposium on Operating Systems Principles, Oct. 14, 2007, pp. 205-220.

Egger, Daniel, "SQL in the Cloud", Retrieved from <<http://e-collection.library.ethz.ch/eserv/eth:202/eth-202-01.pdf>>, Mar. 2009, 57 Pages.

Elnikety, et al., "Database Replication Using Generalized Snapshot Isolation", In Proceedings of the 24th IEEE Symposium on Reliable Distributed Systems, Oct. 26, 2005, 12 Pages.

Escriva, et al., "HyperDex: A Distributed, Searchable Key-Value Store", In Proceedings of the ACM SIGCOMM Conference on Applications, Technologies, Architectures, and Protocols for Computer Communication, Aug. 13, 2012, 12 Pages.

Friedman, et al., "SQL/MapReduce: A Practical Approach to Self-Describing, Polymorphic, and Parallelizable User-Defined Functions", In Proceedings of the VLDB Endowment, vol. 2, Issue 2, Aug. 24, 2009, 12 Pages.

Gray, et al., "The Dangers of Replication and a Solution", In Proceedings of the ACM SIGMOD International Conference on Management of Data, vol. 25, Issue 2, Jun. 1996, pp. 173-182.

Greenberg, et al., "VL2: A Scalable and Flexible Data Center Network", In Proceedings of the ACM SIGCOMM Conference on Data Communication, Aug. 17, 2009, 12 Pages.

Gribble, et al., "Scalable, Distributed Data Structures for Internet Service Construction", In Proceedings of the 4th Conference on Symposium on Operating System Design & Implementation, vol. 4, Oct. 22, 2000, 14 Pages.

Kallman, et al., "HStore: A High-Performance, Distributed Main Memory Transaction Processing System", In Proceedings of the VLDB Endowment, vol. 1, Issue 2, Aug. 24, 2008, 4 Pages.

(56) References Cited

OTHER PUBLICATIONS

Kennedy, Michael, "MongoDB vs SQL Server 2008 Performance Showdown", Retrieved from <<http://blog.michaelckennedy.net/2010/04/29/mongodb-vs-sql-server-2008-performance-showdown/>>, Apr. 29, 2010, 15 Pages.

Kohler, et al., "HotCRP Conference Management Software", Retrieved from <<http://www.read.seas.harvard.edu/~kohler/hotcrp/>>, Jan. 15, 2007, 2 Pages.

Lakshman, et al., "Cassandra—A Decentralized Structured Storage System", In Proceedings of the Workshop on Large-Scale Distribued Systems and Middleware, Oct. 19, 2009, 6 Pages.

Levandoski, et al., "Deuteronomy: Transaction Support for Cloud Data", In Proceedings of the Fifth Biennial Conference on Innovative Data Systems Research, Jan. 9, 2011, pp. 123-133.

Limprecht, Rodney, "Microsoft Transaction Server", In IEEE Proceedings of Compcon, Feb. 23, 1997, pp. 14-18.

Lloyd, et al., "Don't Settle for Eventual: Scalable Causal Consistency for Wide-Area Storage with COPS", In Proceedings of the 23rd ACM Symposium on Operating Systems Principles, Oct. 23, 2011, 15 Pages.

MacCormick, et al., "Boxwood: Abstractions as the Foundation for Storage Infrastructure", In Proceedings of the 6th Symposium on Operating System Design and Implementation, Dec. 6, 2004, pp. 105-120.

Mao, et al., "Cache Craftiness for Fast Multicore Key-Value Storage", In Proceedings of the 7th ACM European Conference on Computer Systems, Apr. 10, 2012, 14 Pages.

"International Search Report and Written Opinion issued in PCT Application No. PCT/US2013/075171", Mailed Date: Aug. 7, 2014, 13 Pages.

Peng, et al., "Large-scale Incremental Processing Using Distributed Transactions and Notifications", In Proceedings of the 9th USENIX Symposium on Operating Systems Design and Implementation, Oct. 4, 2010, 14 Pages.

Ports, et al., "Transactional Consistency and Automatic Management in an Application Data Cache", In Proceedings of the 9th USENIX Conference on Operating Systems Design and Implementation, Oct. 4, 2010, 14 Pages.

Pugh, William, "Skip Lists: A Probabilistic Alternative to Balanced Trees", In Proceedings of Workshop on Algorithms and Data Structures, Aug. 17, 1989, 8 Pages.

Shalom, Nati, "YeSQL: An Overview of the Various Query Semantics in the Post Only-SQL World", Retrieved from http://natishalom.typepad.com/nati_shaloms_blog/2010/07/yesql-an-overview-of-the-different-queries-semantics-in-the-post-only-sql-world.html, Jul. 15, 2010, 4 Pages.

Sovran, et al., "Transactional Storage for Geo-Replicated Systems", In Proceedings of the Twenty-Third ACM Symposium on Operating Systems Principles, Oct. 23, 2011, 16 Pages.

* cited by examiner

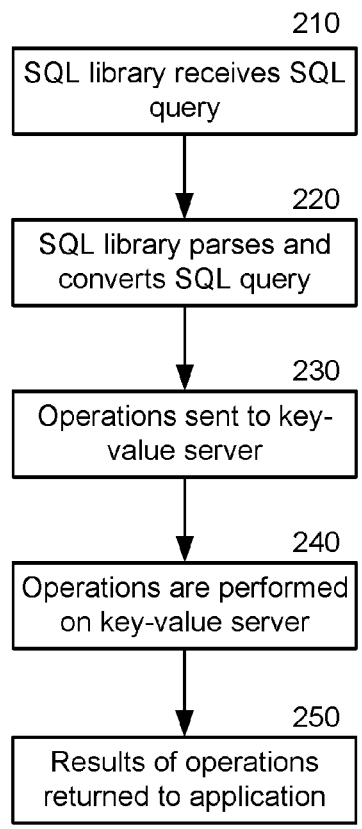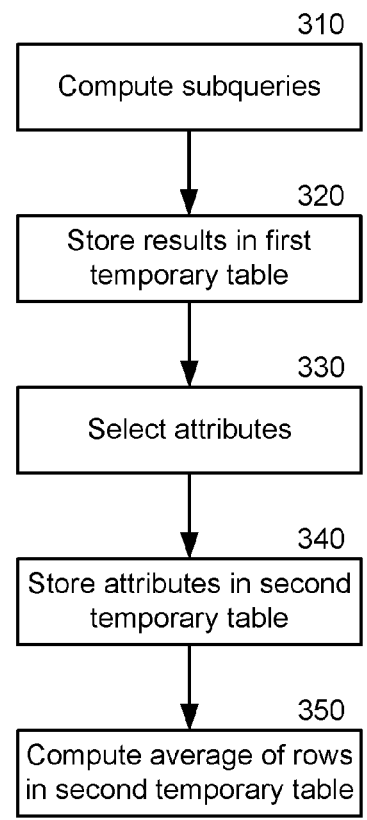
FIG. 3
FIG. 4

DISTRIBUTED SQL QUERY PROCESSING USING KEY-VALUE STORAGE SYSTEM

CROSS-REFERENCE TO RELATED APPLICATIONS

This application is a continuation of U.S. application Ser. No. 13/712,993, filed on Dec. 13, 2012, the disclosure of which is hereby incorporated in its entirety.

BRIEF BACKGROUND

Large-scale web-based applications may use a distributed storage system to store application data such as data about its users, customers, internal state, etc. Existing storage systems for web-based applications include both traditional database systems that generally feature use of the Standard Query Language (SQL) and "NoSQL" storage systems that do not use SQL. SQL is a well-known and widely-used query interface featuring powerful functionality via use of a declarative language that is more concise than imperative programming languages, such that a few lines of SQL may equate to hundreds of lines of code used to implement the same functionality using a NoSQL system.

In general, traditional database systems using SQL are difficult and expensive to scale because they utilize costly special hardware and/or have high overhead (e.g., expensive system administrators to partition data and tune performance). Over the past ten years, however, many companies that develop and utilize large-scale web applications have replaced traditional SQL database systems with specialized custom-built storage systems without SQL that feature better performance, better scalability, and reduced costs (both hardware and overhead). However, these "NoSQL" storage systems provide only a subset of the functionality available in traditional SQL database systems. For example, NoSQL storage systems may lack joins, subqueries, secondary keys, aggregation, and other features offered by SQL.

Consequently, web applications utilizing NoSQL storage systems that need this missing functionality must provide it themselves, which in turn increases the effort and cost of developing such applications for operation with NoSQL storage system. Furthermore, NoSQL storage systems generally feature custom interfaces and query languages that are specific to that storage system (i.e., are non-standard and ad-hoc); as a result, web applications developed to use one specific NoSQL system may not work with other NoSQL storage systems without significant changes being made to such web applications to make them compatible with the custom interface and query language featured by the other NoSQL storage system.

BRIEF SUMMARY

Various implementations disclosed herein are directed to storage systems that support SQL while also providing scalability and high fault tolerance. These implementations feature an SQL library (the SQL execution component) layered on top of a transactional key-value system (the data storage component). More specifically, the SQL library comprises a parser and an execution engine running at client machines, while the storage component comprises a one or more storage servers implementing a key-value system for storing the data. The client-side SQL library parses SQL queries received from client applications and maps these SQL queries to operations (e.g., transactions) on the key-value system that executes these operations to read and write data items identified by key (without any schemas). The key-value system supports transactions and further provides concurrency control mechanisms to handle concurrent transactions. The key-value system may be implemented using any of several techniques to provide scalability and fault tolerance. For several such implementations, the key-value system may be a distributed system with several storage servers each attached to one or more local storage devices.

Some implementations are directed to a distributed SQL query processing system comprising a key-value server for storing key-value objects; at least one client that is communicatively coupled to the key-value server; a key-value library for processing an operation on one of the key-value objects; and an SQL library for receiving an SQL query from an application and converting the SQL query into a transaction for the key-value library to process.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary and the following detailed description of illustrative implementations are better understood when read in conjunction with the appended drawings. For the purpose of illustrating the implementations, there is shown in the drawings example constructions of the implementations; however, the implementations are not limited to the specific methods and instrumentalities disclosed. In the drawings:

FIG. 3 is a process flow diagram of an exemplary method for executing SQL queries on a transactional key-value data storage system that may be utilized by the various implementations disclosed herein;

FIG. 4 is a process flow diagram representative of an exemplary method that may be utilized by the various implementations disclosed herein for executing SQL queries that use intermediary results calculated and stored in temporary tables.

DETAILED DESCRIPTION

Figure 1:
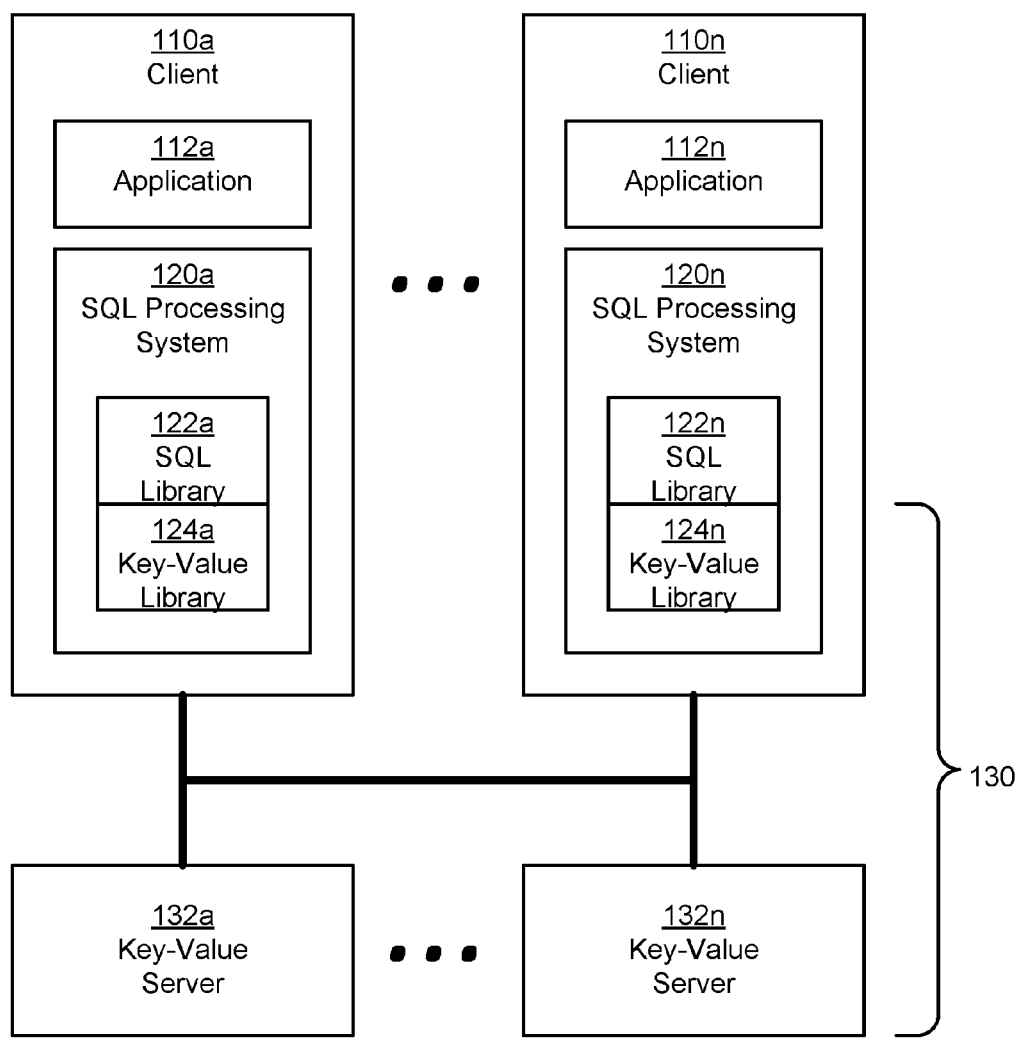
FIG. 1 is a block diagram illustrating an exemplary distributed SQL query processing system representative of various implementations disclosed herein.

Traditional distributed database systems—which, again, are difficult and expensive to scale—generally fall into two categories: shared-disk systems and shared-nothing systems. In shared-disk systems, the database servers share one or more disks (or other storage devices) and coordinate with each other to control concurrent access to these shared devices through the use of locking or synchronization protocols. The drawback of this approach, however, is the overhead imposed by these protocols, which limits scalability and complicate the design of these systems. Shared-nothing systems, on the other hand, do not share disks but instead partition data across the various servers and each server stores a fraction of the data. To execute a database query in these systems, the query is decomposed into sub-queries that execute on the appropriate servers to produce results that are combined to answer the query. A drawback of this approach, however, is that it requires efficiently partitioning the data across the servers and efficiently querying the stored data, where achieving these efficiencies involves substantial manual tuning by administrative experts.

To overcome the shortcomings of SQL and NoSQL systems described above, some solutions (referred to herein as "two-layer approaches") have attempted to divide the storage system into two distinct and separate layers featuring a "transaction layer" above a "data layer", where the transaction layer coordinates transaction execution and is responsible for concurrency control, whereas the data layer stores data. However, unlike existing two-layer approaches, the two components (SQL execution and data storage) of the various implementations disclosed herein are different in that the data storage layer has transactions in it and is responsible for concurrency control. In other words, the data storage component of the various implementations disclosed herein effectively comprises both the transaction layer and data layer, while the SQL execution provides additional transactional functionality (offered by SQL) not otherwise featured among the transactional capabilities of the data storage component.

Other solutions (referred to herein as "record management systems") have employed a transactional record manager for each custom database system wherein transactions are written to a shared global log to enable each custom database system to replay each transaction (i.e., transactions on the other custom database systems) in order to construct its own replica of the database state. However, these record management systems have not been implemented for relational databases but instead have been limited to transactional key-value systems. In contrast, the various implementations disclosed herein are implemented for relational database systems and, although several such implementations do include a transactional key-value system as a component thereof, the storage system itself is nonetheless a relationship database.

In any event, processing queries in traditional SQL database systems occurs at the database servers along with storing and managing data. In addition to database servers being expensive, however, adding more database servers to a shared-disk database system substantially increases the coordination overhead necessary to enable an increased number of database servers to access the shared data. Likewise, in shared-nothing database systems, adding more servers uses costly and resource-intensive operations to repartition the data at a finer granularity over the increased number of servers available. Similarly, for concurrency control mechanisms in a traditional SQL database system, the transaction coordinator is also located at a server, but the server is difficult to scale for the same reasons given above.

The enhanced scalability of the various implementations disclosed herein (compared to existing database systems) stem from allowing query processing and concurrency control to be scaled independently from the storage servers. For example, the query processing and concurrency control may be performed at the clients. In this manner, the ability to process more SQL queries is proportional to the number of clients. As a result, increasing the number of clients provides additional hardware to process SQL queries. This increased hardware also provides the increased processing power used for scalable concurrently control. Because the concurrency control mechanisms running at the transactional key-value system constitute a simple service—merely storing key-value pairs—they can be efficiently scaled when the clients serve as the coordinators for their own transactions as featured by the various implementations disclosed herein.

Accordingly, various implementations disclosed herein are directed to a database system that supports SQL but having performance and scalability comparable to existing NoSQL systems and unachievable by traditional SQL database without costly specialized hardware and extensive manual system administration. These various implementations efficiently map SQL queries to operations on key-value objects stored on a key-value system wherein most simple SQL queries are mapped to a relatively small number of operations. More specifically, the SQL query processing system comprises a key-value server for storing a plurality of key-value objects, at least one client that is communicatively coupled to the key-value server, a key-value library for processing operations on the key-value objects, and an SQL library for receiving an SQL query from an application and converting the SQL query into operations for the key-value library to process.

Of course, while various implementations disclosed herein may comprise a key-value library and SQL library located at the client, various alternative implementations are also anticipated. For example, various alternative implementations may comprise an SQL library and key-value library that is maintained in a second machine separate from the client (and possibly separate from the key-value server), in which case the client generates the SQL query and sends it to the SQL library at the second machine. Other alternative implementations may comprise an SQL library at the client machine and a key-value library at a second machine, where the client may generate the SQL query and process it locally (since the SQL library is in the same machine). The client then generates a key-value operation which is sent to the second machine where the key-value library is located, and the key-value library at the second machine then sends the key-value operation to a key-value server. In yet other alterative implementations, the SQL library may be located at a second machine, and the key-value library located at a third machine. In this arrangement, the client generates the SQL query at the client (first machine) and sends it to the SQL library in the second machine, which in turn generates a key-value operation that is then sent to the key-value library in the third machine which then sends the key-value operation to a key-value server. Other such alternative implementations are also possible. Accordingly, the description of various the implementations herein may presume that the SQL library and key-value library are located at the client, but this is not intended to be limiting as other alternatives are also herein anticipated.

FIG. 1 is a block diagram illustrating an exemplary distributed SQL query processing system 100 representative of various implementations disclosed herein. In the following description, the use of "n" in one instance does not necessarily equate to the same number or count for the use of "n" in another instance. In the figure, the distributed SQL query processing system 100 comprises a set of client machines 110a . . . 110n (also referred to as clients or client machines 110) each running an application 112a . . . 112n (referred to as applications 112) capable of generating one or more SQL queries. The applications 112 submit (or issues) SQL queries to the SQL processing system 120a . . . 120n (referred to as SQL processing systems 120) of the various implementations herein disclosed. The SQL processing systems 120a . . . 120n comprise SQL libraries 122a . . . 122n (referred to as SQL libraries 122) and key-value libraries 124a . . . 124n (referred to as key-value libraries 124) for processing an operation (where the operation could be a transaction) on the key-value server and running on each of the client machines 110. The SQL processing systems 120a . . . 120n further comprise key-value servers 132a . . . 132n (referred to as key-value servers 132 or just "servers") communicatively coupled to each of the client machines 110, and wherein the key-value servers 132 (i.e., storage servers) and the key-value libraries 124 together constitute the transactional key-value system 130 of the SQL processing system 120. In this transactional key-value system 130, the key-value servers 132 comprises a key-value storage (shown as key-value storage 174 in FIG. 2, for example), while the key-value libraries 124 each comprises a local key-value storage (shown as local key-value storage 162 in FIG. 2, for example) representative of the key-value storage 174 on the key-value server. The key-value servers 132 store the key-value objects also referred to as kv-objects (each a key-value pair, discussed below).

In operation, the SQL libraries 122 map the SQL queries received from the applications 112 to operations on the key-value system 130. The key-value system 130 may be implemented using known distributed systems techniques and, in this design, the system architecture 100 inherits the performance and scalability of the key-value system 130.

It should be noted that, while applications 112a . . . 112n are described above as being different applications (or independent copies of the same application running on different clients), for various alternative implementations application 112a . . . 112n may instead constitute various subcomponents located on different client machines but nonetheless together comprising a single application. Accordingly, nothing herein is intended to limit the disclosure of such implementations to any single form but that these alternative forms are herein anticipated.

Figure 2:
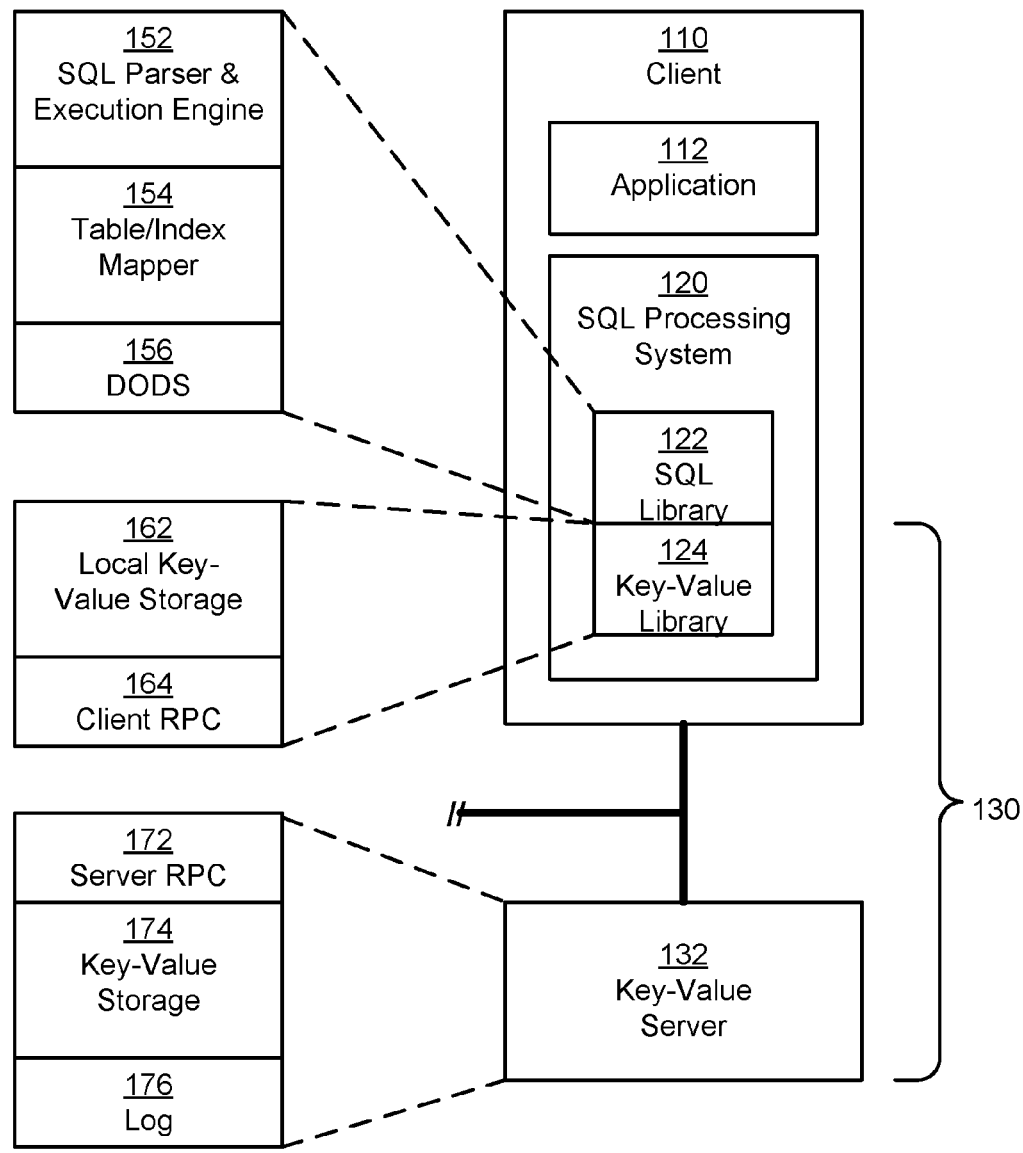
FIG. 2 is a block diagram illustrating an exemplary structure for the SQL library, key-value library, and key-value server of FIG. 1 utilized by various implementations herein disclosed.

FIG. 2 is a block diagram illustrating an exemplary structure for the SQL library 122, key-value library 124, and key-value server 132 of FIG. 1 utilized by various implementations. The SQL library 122 comprises an SQL parser and execution engine 152, a table/index mapper 154, and a distributed ordered data structure (DODS) 156 (the functionality of the DODS is described in more detail below). The key-value library 124 comprises a local key-value storage 162 (which may include key mapping functionality) and a remote procedure protocol (RPC) client component 164. The key-value server 132 further comprises a RPC server component 172, a key-value storage 174, and a log 176, where the key-value storage 174 herein may be a multiversion storage which stores possibly multiple versions of the value for each key.

For the various implementations, a transactional key-value storage system stores key-value pairs that are herein referred to as kv-objects. The key-value system further groups kv-objects into containers, which are similar to directories in a traditional file system except that there is a flat hierarchy without subdirectories. For such implementations, the key of each kv-object comprises a container id concatenated with an object id. The key-value system further supports the execution of operations that are transactions, where the transaction operation may include several operations to read and write key-value pairs, while providing the ACID (atomicity, consistency, isolation, durability) properties of transactions.

For such implementations, the transactions of the key-value system ensure the snapshot isolation property, which provides three guarantees: (1) that a transaction reads from a snapshot, containing all updates committed before a start timestamp, when the transaction starts; (2) that when the transaction commits, its writes are applied together to create a new snapshot; and (3) that if two concurrent transactions write to the same location (target or destination), one of them is aborted to avoid a conflict. Such a transactional key-value system may be implemented using any of several known techniques.

FIG. 3 is a process flow diagram 200 of an exemplary method for executing SQL queries on a distributed SQL query processing system 100 that may be utilized by the various implementations disclosed herein. At 210, an SQL library 122 executing on a client receives an SQL query from an application executing on the client. At 220, the SQL library 122 parses the SQL query at the client and converts the SQL query into operations on key value objects stored on the transactional key-value system; such operations are executable on the transactional key-value system 130. At 230, these operations are communicated from the client to the server via RPC client component 164 and the RPC server component 172 and, at 240, the operations are performed on the key-value server 132. The results of these operations (or a handle to the results of the operations) are returned to the application at 250.

Using the aforementioned transactional key-value system, the various implementations disclosed herein are able to store SQL objects including but not limited to tables, indices, and schemas.

An SQL table is a set of rows, each row with several columns, with one column designated as the primary key and with no two rows ever having the same value for the primary key. If the user does not specify a primary key, the system may provide a rowid that comprises an integer associated with that row (and only that row) in the table. For example, a user table in a web application may keep a numerical userid, username, password, first name, last name, email address, and account options as separate columns in the table, and the primary key could be the userid, the username, or the rowid to the extent these entries would serve to uniquely identify the corresponding row within the table.

For implementations herein disclosed, the key-value system stores each table row in its own kv-object in the transactional key-value system, where the kv-object's container is the table-id and the kv-object's object id is the row's primary key. However, this approach has two limitations. First, while key-value systems may use fixed-length keys, SQL tables permit the primary key to be of any length (depending on the schema), and skilled artisans will appreciate that hashing the primary key to obtain a fixed-length key is possible but problematic because collisions may result. Moreover, as featured by several such implementations, using the object key to determine placement—i.e., to determine which server will store the kv-object—does not necessarily lead to a good placement in terms of locality and load balancing and thereby unintentionally but negatively impacting efficiency.

Accordingly, various alternative implementations may instead use the rowid as the primary key (instead of the kv-object's id) to map a row to a specific kv-object and thereby avoid the issues described above. Since the rowid is a fixed-length integer it is completely compatible with the key of the kv-objects, even for those implementations that allow users to choose the rowid (to direct where a row is to be inserted into the table). Moreover, for certain such implementations, the key-value system may use the higher bits of the rowid to determine the specific server for storing the kv-object, giving placement control to the user if desired but still allowing the system to determine placement if the user elects not to do so. Regardless, if the primary key of a table is an integer, such implementations can use the primary key to map the table rows to kv-object ids.

For SQL tables, indices (or "indexes") may be used to efficiently find rows based on the value of a chosen column by mapping the value of an indexed column (referred to as the index key) to the rows that contain that particular value. For example, a user table may have indices for userid, username, email, or the concatenation of multiple columns (e.g., last name and first name). As such, indices support efficient SQL operations for insertion, deletion, range search (e.g., finding the largest key less than or equal to a given value), and ordered traversal (e.g., given a key, finding the next or previous key in the key order). However, it is not possible to map these operations directly to the transactional key-value systems for three reasons: (1) key-value systems do not support range search or ordered traversal; (2) while keys in the key-value system uniquely identify each entry, index keys do not; and (3) the keys in the key-value system have a small fixed length (128 bits) while index keys may be variable length and much larger. To overcome these shortcomings, various implementations disclosed herein perform SQL index operations using a distributed ordered data structure (DODS) built on top of the key-value system (described in more detail herein), and indices are stored in this data structure.

In SQL systems, each SQL table has a schema—representing each column in the table and its type—and the schema is stored inside a "master table" maintained at a higher level of abstraction by the SQL system itself. This master table, in turn, has a fixed schema that is hard-wired into the SQL system code. Implementations disclosed herein similarly feature a master table.

For scalability, SQL tables can be partitioned horizontally or vertically. Horizontal partitioning spreads the rows across multiple storage locations, e.g., for an SQL table of users, a subset of users may be stored in one place while another subset may be stored in another. Vertical partitioning, on the other hand, spreads the columns across multiple storage locations (e.g., storing the name and email columns in one place while storing the account setting columns in another, and duplicating the primary keys in both locations for reference). Both horizontal and vertical partitioning can be used simultaneously in SQL systems.

For various implementations disclosed herein, one or both types of partitioning may be provided. Horizontal partitioning for such implementations is achieved in the various implementations disclosed herein by mapping different rows to different kv-objects such that the key-value system stores different kv-objects on different servers based on the key of such kv-objects. Vertical partitioning, on the other hand, may be provided by storing a table row under multiple kv-objects on different servers where each kv-object does not correspond to a row but, instead, stores one or more columns (i.e., vertical partitions) and the key for such kv-objects may contain the partition id (a small integer) concatenated with the rowid for ready reference.

SQL systems also support multiple databases—where each database is a set of tables—to enable certain applications to use different databases in order to isolate their data and avoid table name clashes. The various implementations disclosed herein provide similar functionality by including the database id as a prefix of the container of objects stored in the transaction key-value system. For example, in some implementations the key of a kv-object might be the combination of the database-id and table-id (together forming a 64-bit container-id) plus the row-id (a 64-bit object-id).

In SQL systems, the execution of SQL queries often generates intermediary results kept in temporary (or "ephemeral") tables. Various implementations disclosed herein may also utilize temporary tables to implement SQL features that utilize them (such as aggregation, set operations, subqueries, and sorting). For example, consider the following SQL query:

SELECT AVG(age) FROM users WHERE type IN
    (SELECT type FROM usertypes WHERE privileged=1)

As will be appreciated by skilled artisans, this query is an aggregation function (AVG) that includes a subquery (the second line SELECT). To mimic SQL system functionality, various implementations herein disclosed may utilize the methodology illustrated in FIG. 4.

FIG. 4 is a process flow diagram representative of an exemplary method 300 that may be utilized by various implementations disclosed herein for executing SQL queries that use intermediary results that are calculated and stored in temporary tables, here a query that includes a subquery. At 310, the system first computes the subquery. With regard to the sample query above, this computation selects user types that have the privileged attribute set specified. At 320, the system stores the result in a first temporary table.

At 330, the system selects the attribute (e.g., age) corresponding to the table entries (e.g., users) with the same type as found in the temporary table and, at 340 stores these attributes (e.g., ages) in a second temporary table. At 350, the system computes the average of the rows in the second temporary table which is then returned as the result of the query. In addition, and for certain implementations, the temporary tables may be stored at the client (not the key-value servers) for added efficiency.

Since SQL is a declarative language—that is, a language where the programmer does not indicate how the query should be executed but merely what results are desired—an SQL query must be evaluated by the SQL system to determine how the query should be executed. Accordingly, an SQL system first parses a query into some intermediary representation from which a series of individual execution steps to complete the query can be identified. The SQL system executes these specific steps against the actual stored data to return the result. For example, consider the following SQL query:

SELECT userid FROM users WHERE
    email='a@b.com'

An SQL system would first parse this query into the following steps (represented here in a stylized form for illustrative purposes only):

result = range-search "a@b.com" in email index of users
// get largest key <= "a@b.com"
while result.key = "a@b.com" do
    tablerow = fetch result.row from users table
    output tablerow.userid
    result = getnext // get next key in index In some SQL systems, such queries may be parsed and executed at the specific server storing the required data in order to avoid sending intermediary results of the computation across the network. However, while this technique is seemingly efficient, it is also limiting in that the system requires that all data needed by the query reside at a single server. This is possible for centralized database systems (which have limited scalability), in systems where data is perfectly partitioned (and data that is in fact partitionable), or in systems that can decompose the query into sub-queries that are able to execute independently on multiple servers (although such a decomposition may be difficult or impossible to find, such as when the query joins tables that are stored in different servers, making it impossible to decompose the query and execute it locally).

For generality and simplicity, various implementations disclosed herein parse and execute such queries at the clients (not at the server(s) as in SQL systems). One benefit of this approach is that parsing the SQL does not become a scalability bottleneck because each client executes its own queries and, as more clients are added, more capacity to process the queries is also effectively added. Consequently, scalability is limited only by the underlying key-value system.

It should be noted that this approach seemingly poses two challenges. First, SQL parsing and execution consumes resources at the client—especially the CPU—that may compete with the client application (or other applications executing at the client); however, such competition has no more than a negligible impact on overall client performance. Second, in order to execute the query, the client fetches intermediary data over the network, which in turn incurs a network round-trip cost for each such access to the storage servers; however, this cost also becomes negligible as network latencies shrink and new network designs provide uniform and high bandwidth across machines in a data center. Even using simple but relatively slow Ethernet, this approach performs well in many common circumstances.

As mentioned earlier, various implementations described herein may feature indices in a distributed ordered data structure (DODS) that are stored in the key-value system. Although some such implementations might maintain DODS indices in B-trees using known techniques, various such implementations might instead utilize skiplists that are both simpler and easier to implement than B-trees.

A skiplist is a hierarchy of increasingly sparse linked lists ordered by a "skey" (skiplist key). We use the term skey to distinguish the skiplist key from the key-value keys. To search a skiplist in such implementations, an algorithm starts with the highest-level linked list in the skiplist hierarchy and descends to the next level when the traversal is about to exceed the target skey. This process continues from linked list to linked list until the lowest level is reached, at which point the algorithm either finds the target skey or the place where the skey should have been.

Several implementations described herein may store the skiplist in the transactional key-value system, and thus may become a distributed skiplist to the extent the key-value system is distributed. Regardless, one approach for certain such implementations is to store each skiplist node as one kv-object where skiplist node pointers are kv-object keys. Typically such an approach may use several network round-trips to traverse the several linked lists, which may be excessive. Certain such implementations may feature two optimizations to mitigate these effects. First, each skiplist node may store several skeys instead of just one in order to improve traversal time. Second, some implementations may feature a skey node that stores a lookup skey for each level (which is the skey of the next node in that level), which in turn leads to fewer kv-object fetches as the traversal need not overshoot the target skey as in a traditional skiplist (wherein overshooting causes an extra kv-object fetch per skiplist level).

This distributed skiplist approach supports concurrent access and modifications by multiple clients. Therefore, while centralized systems coordinate accesses using locks, the distributed skiplists utilized by such implementations disclosed herein coordinate accesses by the transactions of the key-value system. For example, a client might add a node by (a) starting a key-value transaction, (b) modifying the previous nodes to point to the new node by writing appropriate kv-objects, (c) writing the kv-object containing the new node, and (d) committing the key-value transaction. In this approach, the transaction may be aborted if another client concurrently modifies the same portion of the skiplist, in which case the client would retry the transaction after, for example, a random exponentially-increasing back-off period of time.

For various implementations described herein, two types of client caches are available, wherein one or both may be utilized for specific implementations. The two types of caches are (1) the key-value cache which stores kv-objects in the key-value library 124 at the clients without any SQL semantics ascribed to them, and (2) the SQL cache which stores items with SQL semantics (rows, indices, and schemas) in the SQL library 122 of the clients. Both types of caches can be write-through or write-back (with updates propagated synchronously or asynchronously to servers). On the one hand, however, a key-value cache is simpler than an SQL cache to utilize because it treats all data uniformly without the need to specialize behaviors for rows, indices, schemas, or other SQL items. On the other hand, an SQL cache can be more efficient because its policy can reflect the item being cached. Therefore, while some implementations may utilize only a key-value cache and other implementations may utilize an SQL cache, several implementations disclosed herein may utilize an SQL cache for the table schemas (which are read frequently but modified rarely) and a key-value cache for all other purposes (i.e., for caching purposes other than caching table schemas).

With regard to the SQL cache, table schemas are compact but are often used to parse most (if not all) queries, and thus efficiencies can be gained by having clients load the schema of a table once and cache that information indefinitely. However, when the schema of a table changes, clients are updated with these changes before committing changes to the table. To do this efficiently, one approach utilized by certain such implementations may rely on epoch numbers at the key-value system (which, as known to skilled artisans, is a common mechanism widely used to indicate a change of configuration in a distributed system). For such implementations, each key-value server may have an epoch number, and clients track the epoch number of the key-value servers that each such client interacts with. Clients then piggyback the epoch number in the requests to the key-value server, and the key-value server checks to see if that epoch number matches its own current number. If it does not, the key-value server rejects the client's request (because its epoch number is outdated).

In operation, when a client changes a schema, it also updates the master table (discussed earlier herein) and increments the epoch number of the key-value servers that store that table. For consistency, the bumping is done in the same transaction that updates the master table, by treating the epoch numbers as special objects at the key-value servers, and having the transaction modify those objects. If a client request is rejected by a key-value server because of an epoch mismatch, the client aborts ongoing transactions involving that key-value server and consults the master table to reload the schema of the tables held at that key-value server.

In contrast, the operation of key-value cache is straightforward: when a client reads or writes data in a transaction, the client retains the data for subsequent reads in the same transaction. This technique does not use a cache coherence protocol because transactions under snapshot isolation read from an immutable snapshot. The key-value system could potentially implement more sophisticated caching techniques.

As will be appreciated by skilled artisans, concurrency control is a consideration in any transactional system, and choices are often made as to (a) what mechanism to use for concurrency control (e.g., pessimistic, optimistic, multiversion) and (b) at what level that mechanism should operate (e.g., kv-objects or SQL items with regard to the various implementations herein disclosed).

Several mechanisms for concurrency control are well known. Pessimistic concurrency control uses locks, where objects are locked for reading or writing to prevent concurrent transactions from performing conflicting accesses. Optimistic concurrency control allows transactions to freely access any object but, upon commit, checks whether the accessed items have been changed by other transactions and, if so, the transaction is aborted. Multiversion concurrency control keeps several versions of objects so that, while objects read by the transaction need not be locked or checked, objects written are checked at commit time for write conflicts. While some implementations disclosed herein may use any of these concurrency control mechanisms, several such implementations utilize multiversion concurrency because this mechanism executes read-only transactions more efficiently, as such transactions do not abort and do not use any locking.

It should be further noted that, similar to caching, concurrency control can also be implemented at either the key-value system level or the level of the SQL. When implemented at the key-value system level, transactions coordinate concurrent access to kv-objects. When implemented at the SQL level, transactions coordinate concurrent access to SQL rows and tables.

Certain implementations disclosed herein specifically utilize concurrency control at the key-value system level because these implementations already use a key-value system that provides transactions with multiversion concurrency control in a scalable and efficient way. Moreover, it is difficult and expensive to implement transactions with multiversion concurrency control for SQL items because the clients would have to track many versions of rows, each stored in a different kv-object, and would have to decide which version to access each time. Nevertheless, although such implementations may run transactions at the key-value level, these transactions still bequeath their ACID semantics to the higher-level SQL transactions that users observe. For instance, an SQL transaction might update several tables, which updates many kv-objects, and those updates are all committed together as one key-value transaction so that they are observed atomically by other users.

Figure 5:
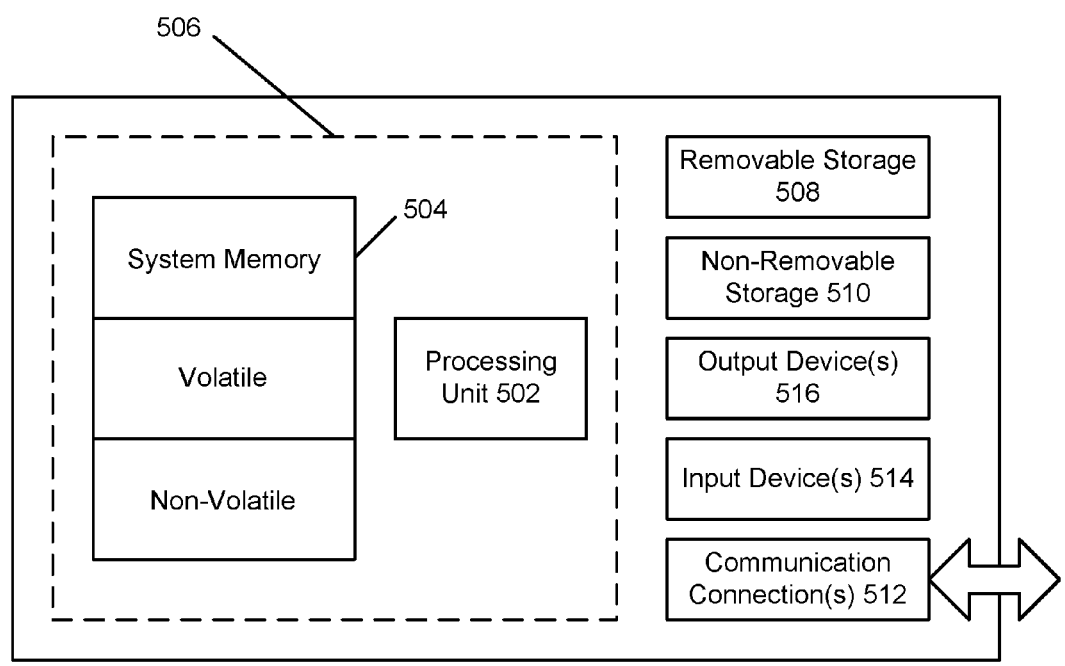
FIG. 5 is a block diagram of an example computing environment that may be used in conjunction with example implementations and aspects.

FIG. 5 is a block diagram of an example computing environment that may be used in conjunction with example implementations and aspects. The computing system environment is only one example of a suitable computing environment and is not intended to suggest any limitation as to the scope of use or functionality.

Numerous other general purpose or special purpose computing system environments or configurations may be used. Examples of well-known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing aspects described herein includes a computing device, such as computing device 500. In its most basic configuration, computing device 500 typically includes at least one processing unit 502 and memory 504. Depending on the exact configuration and type of computing device, memory 504 may be volatile (such as random access memory (RAM)), non-volatile (such as read-only memory (ROM), flash memory, etc.), or some combination of the two. This most basic configuration is illustrated in FIG. 5 by dashed line 506.

Computing device 500 may have additional features/functionality. For example, computing device 500 may include additional storage (removable and/or non-removable) including, but not limited to, magnetic or optical disks or tape. Such additional storage is illustrated in FIG. 5 by removable storage 508 and non-removable storage 510.

Computing device 500 typically includes a variety of computer readable media. Computer readable media can be any available media that can be accessed by device 500 and include both volatile and non-volatile media, as well as both removable and non-removable media.

Computer storage media include volatile and non-volatile media, as well as removable and non-removable media, implemented in any method or technology for storage of information such as computer readable instructions, data structures, program modules or other data. Memory 504, removable storage 508, and non-removable storage 510 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the information and which can be accessed by computing device 500. Any such computer storage media may be part of computing device 500.

Computing device 500 may contain communication connection(s) 512 that allow the device to communicate with other devices. Computing device 500 may also have input device(s) 514 such as a keyboard, mouse, pen, voice input device, touch input device, etc. Output device(s) 516 such as a display, speakers, printer, etc. may also be included. All these devices are well-known in the art and need not be discussed at length here.

Computing device 500 may be one of a plurality of computing devices 500 inter-connected by a network. As may be appreciated, the network may be any appropriate network, each computing device 500 may be connected thereto by way of communication connection(s) 512 in any appropriate manner, and each computing device 500 may communicate with one or more of the other computing devices 500 in the network in any appropriate manner. For example, the network may be a wired or wireless network within an organization or a data center or several data centers or home or the like, and may include a direct or indirect coupling to an external network such as the Internet or the like.

It should be understood that the various techniques described herein may be implemented in connection with hardware or software or, where appropriate, with a combination of both. Thus, the processes and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an API, reusable controls, or the like. Such programs may be implemented in a high level procedural or object-oriented programming language to communicate with a computer system. The programs can also be implemented in assembly or machine language. In any case, the language may be a compiled or interpreted language and it may be combined with hardware implementations.

Although exemplary implementations may be applicable in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include PCs, network servers, data center servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A distributed Standard Query Language (SQL) query processing system comprising: at least a computing device having a processor
    a key-value server for storing a plurality of key-value objects, wherein each key-value object of the plurality of key-value objects includes a key comprising a container id concatenated with an object id;
    a key-value library for processing an operation on one of the plurality of key-value objects;
    an execution component for receiving an SQL query from an application and converting the SQL query into the operation for the key-value library to process; and
    the application for issuing the SQL query to the execution component.

2. The system of claim 1, wherein the execution component comprises a parser and an execution engine.

3. The system of claim 1, wherein the key-value library is located at a client that is communicatively coupled to the key-value server.

4. The system of claim 1, wherein the operation for the key-value library to process is a transaction.

5. The system of claim 4, wherein the key-value server features transaction snapshot isolation.

6. The system of claim 1, wherein the key-value server further comprises a remote procedure protocol (RPC) server component, and wherein the key-value library further comprises an RPC client component.

7. The system of claim 1, wherein the key-value server utilizes multiversion storage.

8. The system of claim 1, wherein the key-value server comprises a key-value storage, and wherein the key-value library comprises a local key-value storage representative of the key-value storage on the key-value server.

9. The system of claim 1, further comprising concurrency control.

10. A method for execution on a distributed Standard Query Language (SQL) query processing system, the method comprising:
    receiving an SQL query at an execution component of a computing device;
    parsing and converting, at the execution component, the SQL query into a plurality of operations executable on a key-value system;
    forwarding the plurality of operations to a key-value server;
    storing a plurality of key-value objects at the key-value server, wherein each key-value object of the plurality of key-value objects includes a key comprising a container id concatenated with an object id; and
    processing an operation on one of the plurality of key-value objects.

11. The method of claim 10, further comprising executing an application for issuing the SQL query to the execution component.

12. The method of claim 11, wherein the application is executed on a client.

13. The method of claim 12, further comprising communicatively coupling the key-value server to the client.

14. The method of claim 10, wherein at least one operation is a transaction.

15. A computer-readable storage hardware device comprising computer-readable instructions for executing an Standard Query Language (SQL) query using a transactional key-value system, the computer-readable storage hardware device comprising instructions that cause a processor to:
    parse and convert, at an execution component for receiving the SQL query from an application, the SQL query into a plurality of operations executable on the transactional key-value system; and
    map an SQL table to a plurality of key-value objects in the transactional key-value system, wherein each key-value object of the plurality of key-value objects includes a key comprising a container id concatenated with an object id.

16. The computer-readable storage hardware device of claim 15, further comprising instructions for causing the processor to map a plurality of SQL indices corresponding to an SQL table to a plurality of key-value objects in the transactional key-value system.

17. The computer-readable storage hardware device of claim 16, further comprising instructions for causing the processor to map the SQL indices to a distributed skiplist.

18. The computer-readable storage hardware device of claim 15, further comprising instructions for causing the processor to cache data at a client using at least one of a key-value cache or an SQL cache.

19. The computer-readable storage hardware device of claim 15, wherein at least one of the plurality of operations is a transaction.

* * * * *